US010447652B2

United States Patent
Chandrashekhar et al.

(10) Patent No.: US 10,447,652 B2
(45) Date of Patent: Oct. 15, 2019

(54) HIGH AVAILABILITY BRIDGING BETWEEN LAYER 2 NETWORKS

(71) Applicant: Nicira, Inc., Palo Alto, CA (US)

(72) Inventors: Ganesan Chandrashekhar, Campbell, CA (US); Xiaohu Wang, Cupertino, CA (US); Hongwei Zhu, Mountain View, CA (US); Ankur Kumar Sharma, Mountain View, CA (US); Vivek Agarwal, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 234 days.

(21) Appl. No.: 15/466,575

(22) Filed: Mar. 22, 2017

(65) Prior Publication Data

US 2018/0278577 A1 Sep. 27, 2018

(51) Int. Cl.
*G06F 15/173* (2006.01)
*H04L 29/12* (2006.01)
*H04L 29/08* (2006.01)

(52) U.S. Cl.
CPC ........ *H04L 61/6022* (2013.01); *H04L 61/103* (2013.01); *H04L 67/1095* (2013.01)

(58) Field of Classification Search
CPC .. H04L 61/6022; H04L 61/103; H04L 61/303
USPC .......... 709/223–224, 249, 251; 370/401–402
See application file for complete search history.

(56) References Cited

U.S. PATENT DOCUMENTS

| 5,018,133 | A | * | 5/1991 | Tsukakoshi | ......... | H04L 61/6022 |
| | | | | | | 370/403 |
| 5,822,512 | A | * | 10/1998 | Goodrum | ............. | G06F 11/142 |
| | | | | | | 714/13 |
| 8,953,616 | B2 | * | 2/2015 | Allan | ................... | H04L 12/462 |
| | | | | | | 370/400 |
| 10,114,713 | B1 | * | 10/2018 | Chen | ....................... | H04L 43/10 |
| 2003/0154315 | A1 | * | 8/2003 | Sultan | .................. | H04L 12/437 |
| | | | | | | 709/251 |
| 2008/0019387 | A1 | * | 1/2008 | Kim | ...................... | H04L 61/103 |
| | | | | | | 370/401 |
| 2010/0005197 | A1 | * | 1/2010 | Huang | .................. | H04L 49/557 |
| | | | | | | 710/8 |
| 2010/0287405 | A1 | * | 11/2010 | Soon | ................... | H04L 43/0811 |
| | | | | | | 709/249 |
| 2010/0296394 | A1 | * | 11/2010 | Krzanowski | ........ | H04L 12/4625 |
| | | | | | | 370/228 |

(Continued)

*Primary Examiner* — Bharat Barot

(57) ABSTRACT

The technology disclosed herein enables high availability bridging between Layer 2 (L2) networks. In a particular embodiment, a method includes high availability bridge cluster comprising a first bridge node and a second bridge node. The first and second bridge nodes include first and second active bridges and first and second standby bridges, respectively. The method provides, in the first active bridge, bridging network communications between two or more L2 networks. The second standby bridge acts as a failover bridge for the first active bridge. The method further provides generating a failure detection message that incorporates a hardware address of the first bridge node and transferring the failure detection message from the first bridge node to the second bridge node. In the second standby bridge, the method provides receiving the failure detection message and using the hardware address to synchronize bridging information between the first active bridge and the second standby bridge.

20 Claims, 6 Drawing Sheets

(56) References Cited

U.S. PATENT DOCUMENTS

2015/0304247 A1* 10/2015 Poggi .................. H04L 45/66
370/401

* cited by examiner

HIGH AVAILABILITY BRIDGING BETWEEN LAYER 2 NETWORKS

TECHNICAL BACKGROUND

The Open Systems Interconnection model (OSI model) for computer networking defines multiple layers on which data can be transferred between networked elements (e.g., systems and devices. The lowest layer of the model, Layer 1 (L1), is defined as the physical layer where bits representing data are transferred over communication links (e.g., as electrical signals over conductive wires). Layer 2 (L2), which is defined as the data link layer, operates on top of L1. L2 provides additional organization for a networked elements. For instance, a L2 network identifies various networked elements based on identifiers, such as Media Access Control (MAC) addresses, for each of those elements. Those identifiers are used as a means for directing data traffic to the proper networked element.

The organizational features of L2 networks also allow distinct L2 networks to operate on a single physical network or across multiple physical networks. The identifiers for networked elements are distinct between the L2 networks and, therefore, allow the L2 networks to remain separate by only being able to exchange network data traffic between certain networked elements. However, there may be situations where an element on one L2 network needs to communicate with an element on another L2 network. In those situations, a network bridge is used to provide a communication bridge between the two L2 networks. Effectively, the network bridge creates a larger aggregate network consisting of the two bridged L2 networks. If for any reason the bridge fails, the aggregate network cannot be maintained and any network traffic that needs to traverse from one L2 network to the other will be undeliverable until a bridge is reestablished.

SUMMARY

The technology disclosed herein enables high availability bridging between Layer 2 (L2) networks. In a particular embodiment, a method includes high availability bridge cluster comprising a first network bridge node and a second network bridge node. The first network bridge node includes a first active bridge and a first standby bridge and the second network bridge node includes a second active bridge and a second standby bridge. The method provides, in the first active bridge, bridging first network communications between two or more L2 networks. The second standby bridge acts as a failover bridge for the first active bridge. The method further provides generating a failure detection message that incorporates a hardware address of the first network bridge node and transferring the failure detection message from the first network bridge node to the second network bridge node. In the second standby bridge, the method provides receiving the failure detection message and using the hardware address to synchronize bridging information between the first active bridge and the second standby bridge.

In some embodiments, the method provides in the second active bridge, bridging second network communications between the two or more L2 networks. The first standby bridge acts as a failover bridge for the second active bridge. In those embodiments, the method also provides generating a second failure detection message that incorporates a second hardware address of the second network bridge node and transferring the second failure detection message from the second network bridge node to the first network bridge node. In the first standby bridge, the method in those embodiments provides receiving the second failure detection message and using the second hardware address to synchronize second bridging information between the second active bridge and the first standby bridge.

In some embodiments, using the hardware address to synchronize the bridging information comprises identifying a first management plane network address for the first network bridge node associated with the hardware address, using the first management plane network address to provide the first network bridge node with a second management plane network address for the second network bridge node, and exchanging the bridging information between the first and second network bridge nodes using the first and second management plane network addresses.

In some embodiments, the bridging information includes hardware addresses of elements in the first network communications that are learned by the first active bridge while bridging the first network communications. In those embodiments, upon activation of the second standby bridge, the method provides using the reverse address resolution protocol (RARP) with the hardware addresses to notify physical L2 network switches to direct the first network communications having the hardware addresses to the second standby bridge.

In some embodiments, the method provides activating the second standby bridge upon not receiving at least one subsequent failure detection message from the first network bridge node.

In some embodiments, the failure detection message comprises one or more packets in a bidirectional forwarding detection (BFD) session between the first and second network bridge nodes. In those embodiments, the BFD session may operate over a link layer protocol within Internet Protocol (IP), such as Ethernet.

In some embodiments, the high availability bridge cluster is assigned a uniform unique identifier (UUID).

In another embodiment, a system is provided having a first network bridge node including a first active bridge and a first standby bridge and a second network bridge node including a second active bridge and a second standby bridge. The first active bridge bridges first network communications between two or more L2 networks. The second standby bridge acts as a failover bridge for the first active bridge. The first active bridge further generates a failure detection message that incorporates a hardware address of the first network bridge node and transfers the failure detection message from the first network bridge node to the second network bridge node. The second standby bridge receives the failure detection message and uses the hardware address to synchronize bridging information between the first active bridge and the second standby bridge.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

To minimize the amount of time elapsed until a failed bridge is replaced, a high availability bridge pair is provided herein. In the high availability bridge pair, one bridge is an active bridge while the other bridge is a standby bridge. The active bridge bridges network communications between at least two networks operating at Layer 2 (L2) (the data link layer) of the Open Systems Interconnection (OSI) model. For example, Virtual Local Area Networks (VLANs) operate at L2 while remaining isolated from one another, which requires network bridging to allow communications to pass from one VLAN to another. While the active bridge is functioning properly, the standby bridge is idle and acting in a failover capacity. Should the active bridge fail for any reason, the standby bridge can more or less immediately begin bridging communications between the L2 networks. The combination of an active bridge and a standby bridge in the bridge pair allows the bridge pair to remain highly available for the bridging needs of the L2 networks. In order for the standby bridge to takeover for the active bridge, information used by the active bridge to pass communications between the L2 networks is supplied to the standby bridge. The information is continually updated so that the standby bridge is always ready to take over for the active bridge should the need arise.

Figure 1:
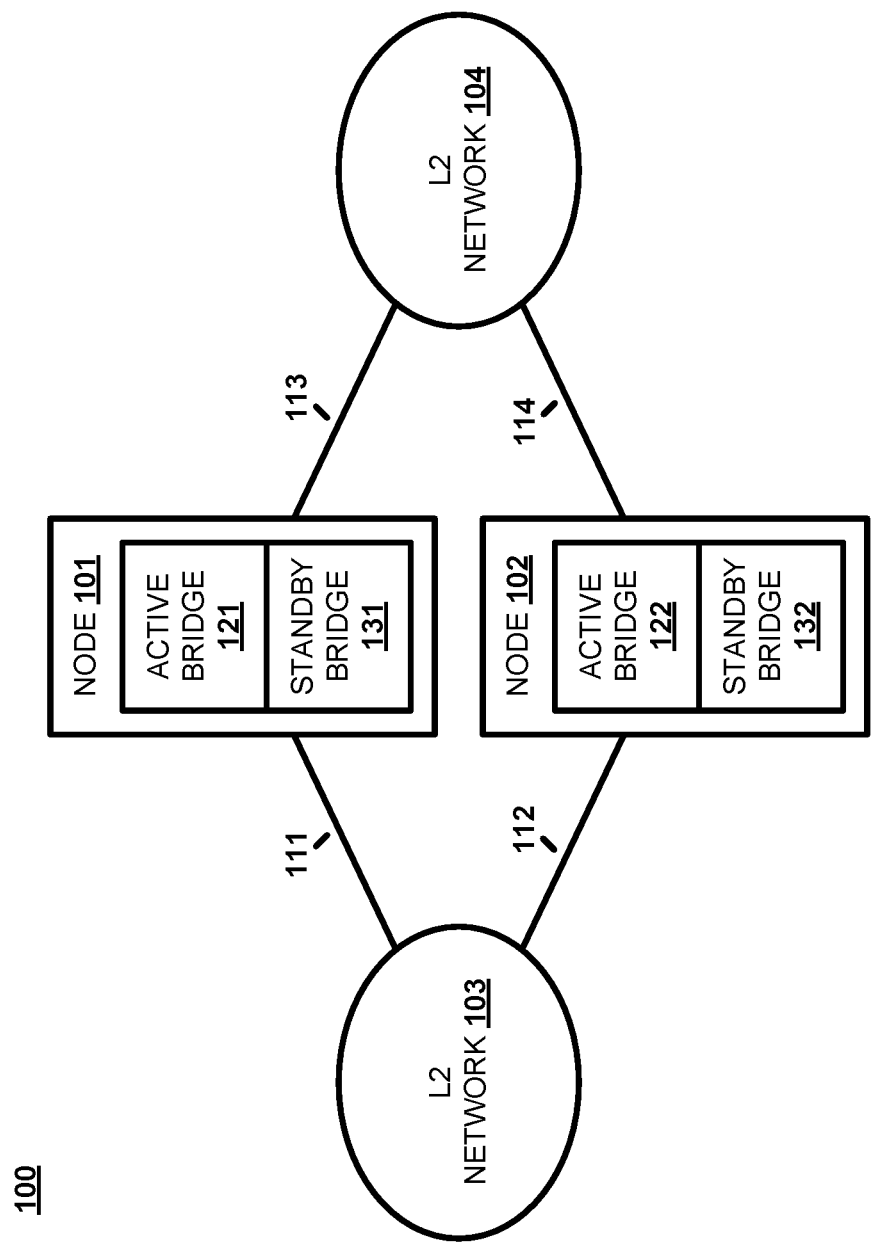
FIG. 1 illustrates a computing environment for high availability bridging between L2 networks.

FIG. 1 illustrates computing environment 100 for high availability bridging between L2 networks. Computing environment 100 includes network bridge node 101, network bridge node 102, L2 network 103, and L2 network 104. Network bridge node 101 includes active bridge 121 and standby bridge 131. Network bridge node 102 includes active bridge 122 and standby bridge 132. Network bridge node 101 bridges between L2 network 103 and L2 network 104 over communication links 111 and 113. Network bridge node 102 bridges between L2 network 103 and L2 network 104 over communication links 112 and 114.

In operation, network bridge node 101, network bridge node 102, L2 network 103, and L2 network 104 may be implemented in one or more physical networks (e.g., comprising routers, switches, access points, etc.) and include one or more networked computing systems. In some examples, at least a portion of the computing systems networked by network bridge nodes 101 and 102 and L2 networks 103 and 104 may be implemented as virtual elements (e.g., virtual machines, containers, etc.) on one or more physical host computing systems.

Network bridge node 101 and network bridge node 102 form a high availability bridge cluster. Each node includes a pair of bridges, an active bridge and a standby bridge. Standby bridge 132 is the standby bridge for active bridge 121 and standby bridge 131 is the standby bridge for active bridge 122. This paired arrangement avoids situations where resources are used to maintain a bridge node having only an idle standby bridge since each bridge node also includes an active bridge. In this example, active bridge 121 and active bridge 122 are both bridging communications between the two distinct L2 networks, L2 network 103 and L2 network 104. However, it should be understood that one of the active bridges may bridge communications between two different L2 networks. L2 network 103 and L2 network 104 may be VLANs, Virtual Extensible LANs (VXLANs), or some other type of L2 network—including combinations thereof.

Figure 2:
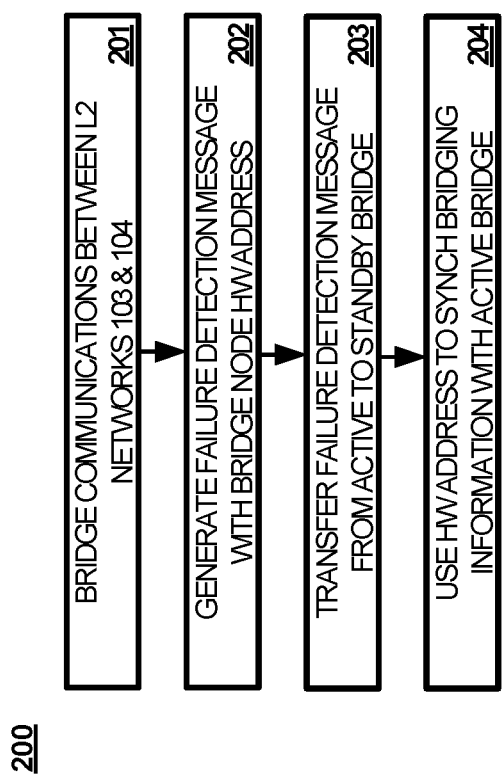
FIG. 2 illustrates a method of operating the computing environment to provide high availability bridging between L2 networks.

FIG. 2 illustrates method 200 of operating computing environment 100 to provide high availability bridging between L2 networks. In particular, the description of method 200 focuses on how active bridge 121 and standby bridge 132 operate for high availability bridging between L2 network 103 and L2 network 104. However, it should be understood that active bridge 122 and standby bridge 131 would perform method 200 in the same manner.

Method 200 provides active bridge 121 bridging network communications between L2 network 103 and L2 network 104 (201). As previously noted, standby bridge 132 is configured to act in a failover capacity for active bridge 121. Active bridge 121 may be designated as the active bridge of the bridge pair manually by a user, based on the first bridge to become operational, based on a negotiation between the two bridges, based on the bridge's network identifier, based on the bridge's hardware address, based on random selection, or based on some other factor(s)—including combinations thereof. Regardless of how active bridge 121 is designated, the other bridge on network bridge node 101 should be designated as standby, as shown in computing environment 100, so that network bridge node 101 is not handling bridging for two active bridges while network bridge node 102 maintains two standby bridges. However, in other examples, it is possible that one node hosts two active bridges while the other node hosts two standby bridges.

Additionally, method 200 provides active bridge 121 generating a failure detection message that incorporates a hardware address of network bridge node 101 (202). The failure detection message is meant to indicate to standby bridge 132 that active bridge 121 is operational and has not failed. As such, it is relatively common for certain types of failure detection messages to be called heartbeat messages since they indicate whether active bridge 121 is still "alive." The failure detection message may be one of many failure detection messages that are periodically sent to standby bridge 132, although not all failure detection messages necessarily include the hardware address of network bridge node 101. As long as standby bridge 132 continues to receive the failure detection messages within a requisite period of time, standby bridge 132 will remain in a standby state.

The failure detection message may comprise a Bidirectional Forwarding Detection (BFD) message, as discussed further below, or may follow some other protocol. The hardware address may comprise a media access control (MAC) address assigned to network bridge node 101 or may be some other type of identifier that is statically tied to a hardware element or a virtual representation of a hardware element (e.g., a virtual machine). The hardware address may be incorporated into the failure detection message by piggybacking a data packet having the hardware address on a data packet comprising the failure detection message, may be included in the payload of the failure detection message data packet, or may associated with the failure detection message in some other way.

As alluded to above, method 200 further provides transferring the failure detection message from the network bridge node 101 to network bridge node 102 (203). Responsively, method 200 provides network bridge node 102 using the hardware address to synchronize bridging information between the active bridge 121 and standby bridge 132 (204). In one example, the hardware address is used by network bridge node 102 to determine network bridge node 101's management plane network address so that network bridge node 102 can communicate with network bridge node 101 over the management plane. The network addresses may then be used to subsequently transfer hardware addresses learned by active bridge 121 while bridging communications between L2 network 103 and L2 network 104. The learned hardware addresses may be hardware addresses for endpoints on communication connections for the bridged communications and, should active bridge 121 fail, standby bridge 132 can use the learned hardware addresses to determine network addresses of L2 network 103 and L2 network 104 corresponding to those endpoints. The learned hardware addresses may be transferred upon being learned by active bridge 121 or may be transferred on a periodic schedule, preferably a schedule that minimizes the chance of any learned network addresses not being transferred in the event that active bridge 121 fails.

From the learned hardware addresses, should standby bridge 132 determine that active bridge 121 failed, standby bridge 132 uses the learned hardware addresses to continue bridging the communications between L2 network 103 and L2 network 104. For instance, standby bridge 132 may use the learned hardware addresses to determine corresponding network addresses in L2 network 103 and L2 network 104. Those network addresses are then used by standby bridge 132 in its capacity as the newly active bridge to bridge the network communications in the same way active bridge 121 did before it failed.

Figure 3:
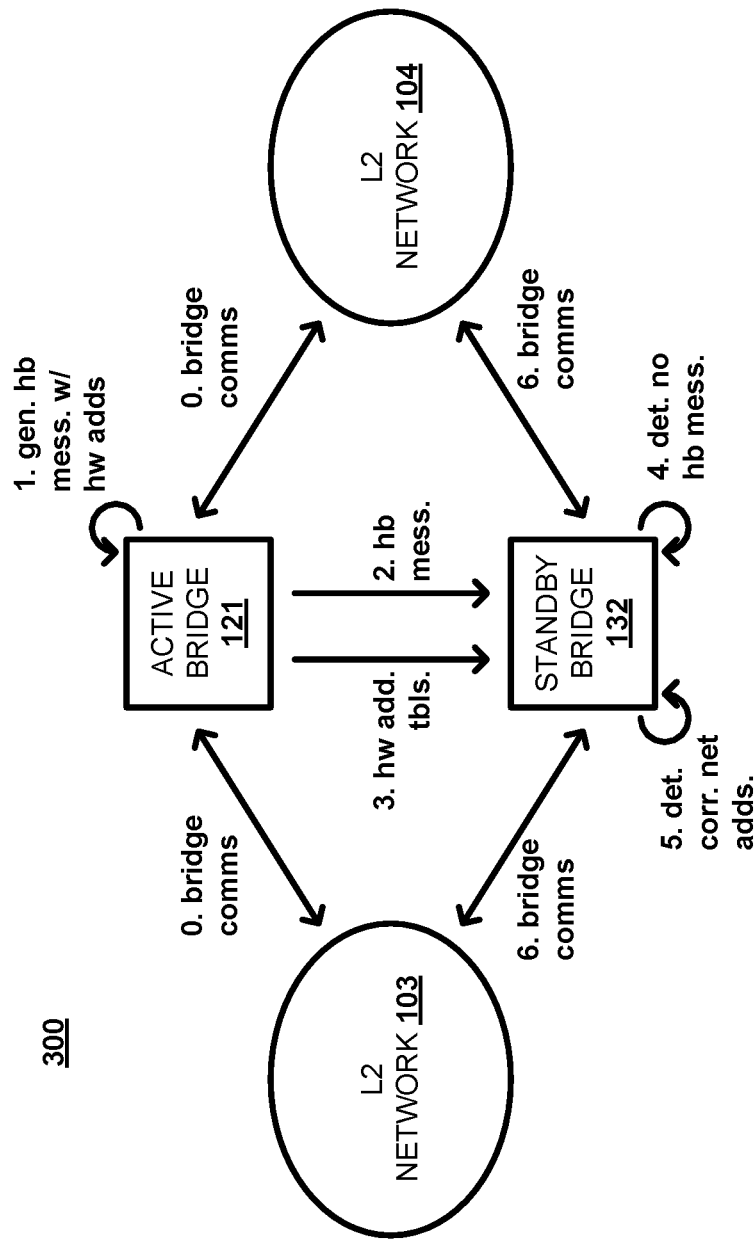
FIG. 3 illustrates an operational scenario of the computing environment to provide high availability bridging between L2 networks according to one implementation.

FIG. 3 illustrates operational scenario 300 of computing environment 100 to provide high availability bridging between L2 networks according to one implementation. Scenario 300 provides a visual example of how method 200 may be used to implement a high availability bridge pair between active bridge 121 and standby bridge 132. At step 0, active bridge 121 is bridging network communications between L2 network 103 and L2 network 104. Active bridge 121 generates, at step 1, a heartbeat message that includes the hardware address of network bridge node 101. The heartbeat message is transferred, at step 2, to standby bridge 132 so that the hardware address can be used to exchange learned hardware addresses over a communication channel between network bridge node 101 and network bridge node 102. Heartbeat messages will continue to be generated and transferred to standby bridge 132 to indicate that active bridge 121 is still active.

Learned hardware addresses for the network communications bridged by active bridge 121 are transferred, at step 3, in a table to standby bridge 132. Subsequent table updates may be transferred to standby bridge 132 to add or delete entries in the table as hardware addresses change for the network communications bridged by active bridge 121.

Eventually, standby bridge 132 determines, at step 4, that it has not received a heartbeat message within the requisite time period since it last received heartbeat message for active bridge 121. Responsively, standby bridge 132 designates itself to now be the active bridge between L2 network 103 and L2 network 104.

To perform as the active bridge, standby bridge 132 determines, at step 5, the logical network addresses corresponding to each of the respective hardware addresses in the table of learned hardware addresses. In one example, standby bridge 132 uses the Reverse Address Resolution Protocol (RARP) to identify the logical network addresses and attract the communication traffic for each of those network addresses (i.e., draw that traffic away from the failed active bridge 121). Once RARP has been performed for endpoints of given network traffic, standby bridge 132 proceeds with bridging, at step 6, that network traffic between L2 network 103 and L2 network 104. Ideally, the determination that active bridge 121 failed and the subsequent activation of standby bridge 132 occurs fast enough that no noticeable interruption in communication traffic between network bridge node 102 and L2 network 103 occurs. Moreover, the failover of active bridge 121 to standby bridge 132 occurs without the need for intervention by a third element, such as a bridge controller element.

Figure 4:
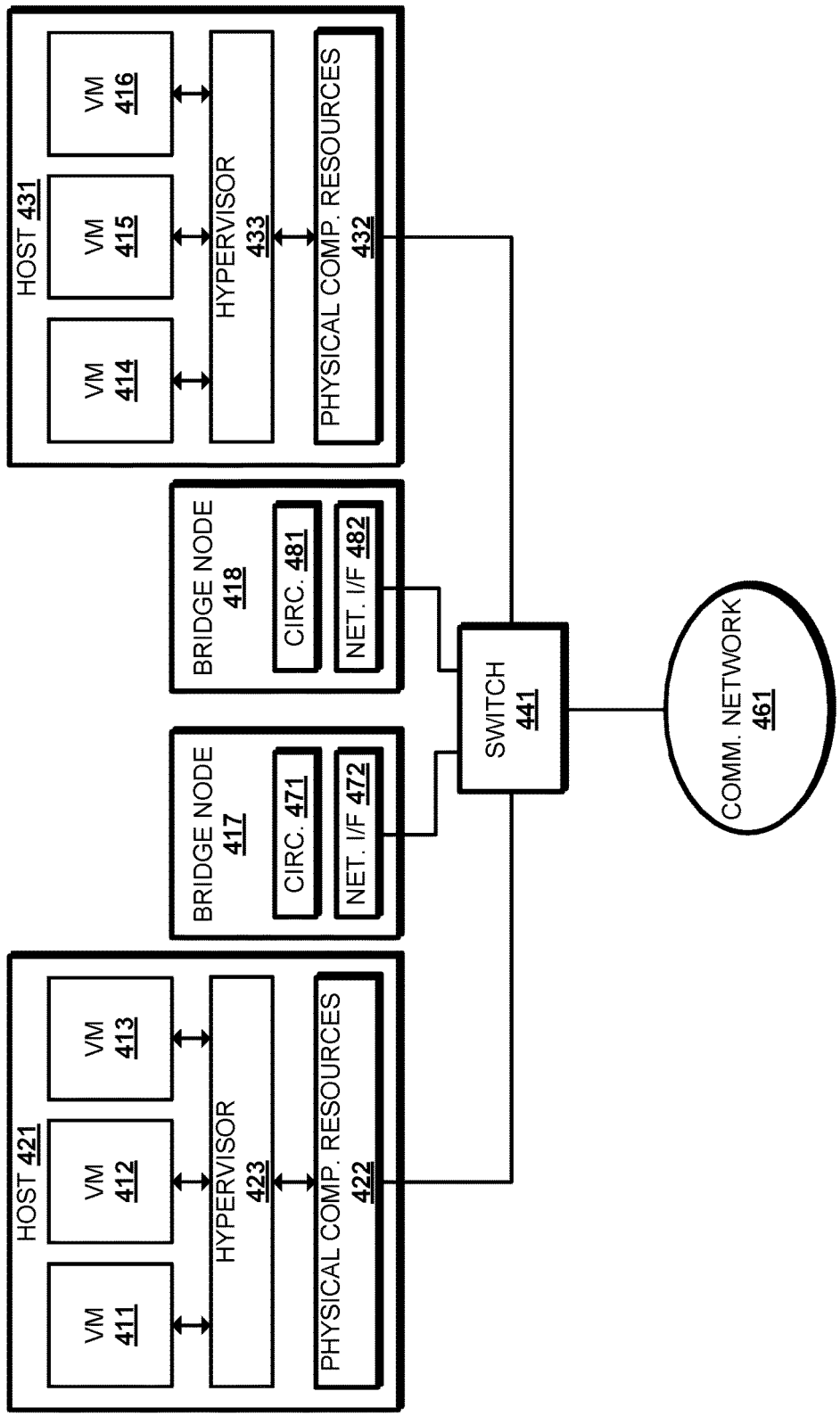
FIG. 4 illustrates another computing environment for high availability bridging between L2 networks.

FIG. 4 illustrates computing environment 400 for high availability bridging between L2 networks. Computing environment 400 includes host computing system 421, host computing system 431, network bridge node 417, network bridge node 418, communication switch 441, and communication network 461. In this example, communication switch 441 comprises an L2 switch that directs L2 communications to/from and between host computing systems 421, 431, and communication network 461. Communication network 461 may include the Internet, one or more local area networks, and/or one or more wide area networks. While shown separately, communication switch 441 may be considered part of communication network 461 in some examples.

Network bridge node 417 includes network interface 472 and processing circuitry 471. Network bridge node 418 includes network interface 482 and processing circuitry 481. Network interfaces 472 and 482 each comprise physical ports for one or more communication physical communication links with communication switch 441. Network traffic on a single communication link between each bridge node and communication switch 441 may be tagged using VLAN or VXLAN tagging to differentiate traffic for various VLANs or VXLANs implemented in computing environment 400 (e.g., VLAN 521 and VXLANs 522-523 described below). Network interfaces 472 and 482 further include circuitry for receiving and transmitting L2 communications over the physical communication links. Processing circuitry 471 and 481 may include one or more Application Specific Integrated Circuits (ASICs), microprocessors, micro-controllers, or some other type of electronic circuitry for controlling network interfaces 472 and 482 to operate network bridge node 417 and network bridge node 418 as described herein. Processing circuitry 471 and 481 may further include storage memory (e.g., Random Access Memory, Flash memory, etc., but in no cases is the storage memory a propagated signal) for storing processing instructions for execution by processing circuitry 471 and 481 to operate network bridge node 417 and network bridge node 418 as described herein.

In this example, host computing system 421 executes hypervisor 423 to allocate physical computing resources 422 among virtual machines 411-413. Likewise, host computing system 431 executes hypervisor 433 to allocate physical computing resources 432 among virtual machines 414-416. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include.

It should be understood that the distribution of virtual machines/elements evenly across two host computing systems, as shown in FIG. 4, is merely exemplary. The six virtual machines/elements shown may instead be implemented on any number of host computing systems from one to six. Likewise, host computing systems 321 and 331 could host additional hosts and virtual machines and/or other virtual elements that are not involved in this example.

Figure 5:
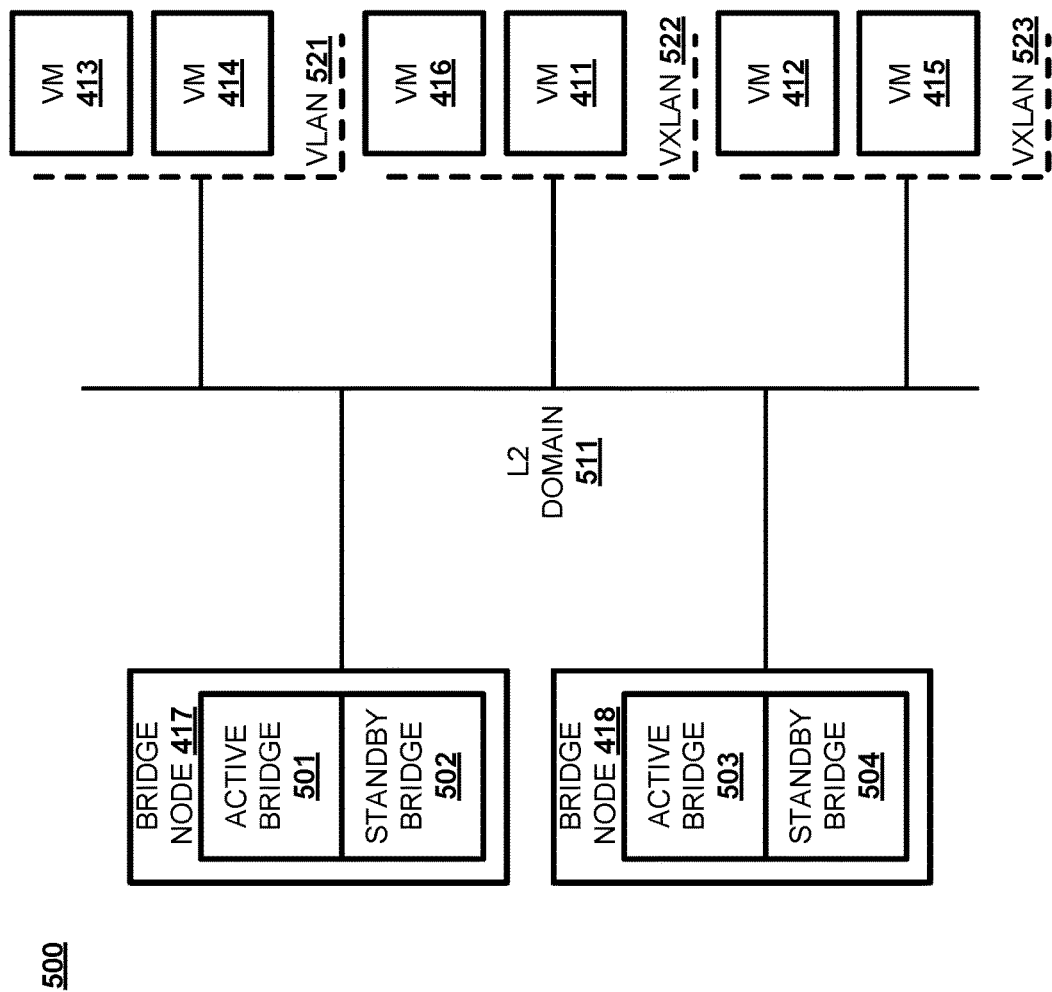
FIG. 5 illustrates a logical arrangement of the other computing environment to provide high availability bridging between L2 networks.

FIG. 5 illustrates logical arrangement 500 of computing environment 400 to provide high availability bridging between L2 networks. In this example, VLAN 521 and VXLANs 522-523 are L2 networks bridged by L2 network bridges within the bridge cluster comprising virtual bridge node 417 and virtual bridge node 418. In particular, virtual bridge node 417 includes active bridge 501 and standby bridge 502 while virtual bridge node 418 includes active bridge 503 and standby bridge 504. While shown separately, virtual bridge node 417 and virtual bridge node 418 may be considered part of one or more of VLAN 521 and VXLANs 522-523, or at least exchange communications with each other over one or more of VLAN 521 and VXLANs 522-523. As such, any communications exchanged between virtual bridge node 417 and virtual bridge node 418 may occur over one or more of those logical networks.

Additionally, the elements of computing environment 400 all exist in the same layer 2 (L2) domain 511. Thus, VLAN 521 and VXLANs 522-523 comprise distinct L2 networks in the same L2 domain. A single L2 domain in this example eliminates the need for L2 loop detection between L2 domains, as there is no other L2 domain from which the loop can occur. Thus, when virtual bridge node 417 and virtual bridge node 418 are initialized and broadcast on L2 domain 511 to identify one another in this example, they need not be concerned with loop back of that broadcast from another L2 domain. Other examples, may include such loop back detection if necessary.

Similarly, when virtual bridge node 417 and virtual bridge node 418 initialize, bridges 501-504 are all in standby mode so that multiple active bridges do not conflict with one another. If a peer bridge is reachable from broadcasting on L2 domain 511 (e.g., if active bridge 501 is able to find standby bridge 502), then an algorithm may be used to determine which of the two should be the active bridge. In one example, a bridge with an even numbered virtual network identifier (VNI), or VXLAN identifier, and a higher media access control (MAC) address than its peer is designated the active bridge and a bridge with an odd numbered VNI and a lower MAC address than its peer would also be designated the active switch. The VNI/VXLAN ID used in the aforementioned example is the VNI/VXLAN ID of the logical network being bridged to the physical network by the two bridges that will be active and standby. For instance, VLAN 521 having a VNI may represent the physical L2 network in this embodiment (i.e., the L2 network absent any logical overlays) while VXLAN 522 and VXLAN 523 comprise logical L2 networks operating on the physical L2 network represented by VLAN 521. As such, when bridging VLAN 521 and VXLAN 522, for example, the VXLAN ID of 522 would be used in the above algorithm. Regardless of how the active switch is determined in each bridge node, this example provides that standby bridge 504 is the standby bridge for active bridge 501 and standby bridge 502 is the standby bridge for active bridge 503.

Figure 6:
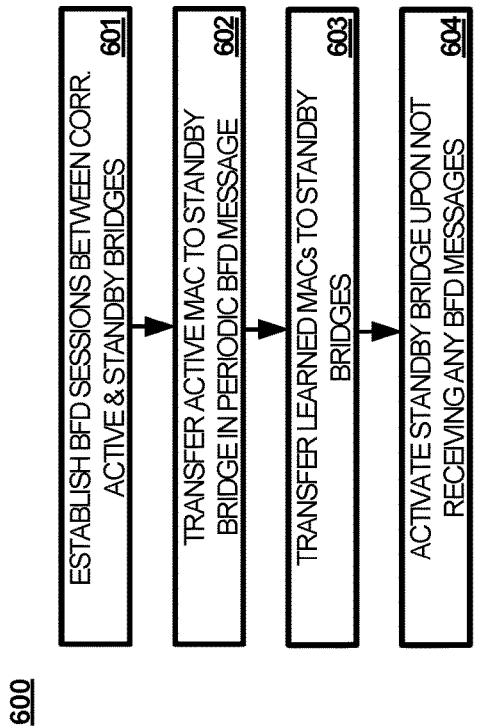
FIG. 6 illustrates a method of operating the other computing environment to provide high availability bridging between L2 networks.

FIG. 6 illustrates method 600 of operating computing environment 400 to provide high availability bridging between L2 networks. In this example, active bridge 501 bridges communications between VLAN 521 and VXLAN 522 while active bridge 503 bridges communications between VLAN 521 and VXLAN 523. Also, virtual bridge node 417 and virtual bridge node 418 exchange communications with each other over VLAN 521, although one or more of the other networks could be used instead. Active bridge 501 and standby bridge 504 will be the focus of this example and method 700 below but it should be understood that the same steps apply in the case of active bridge 503 and standby bridge 502, which would occur at substantially the same time.

Method 600 provides establishing a BFD session between active bridge 501 and standby bridge 504 (601). The BFD session operates to exchange heartbeat messages between active bridge 501 and standby bridge 504 in this example. BFD protocol packets are sent natively on VLAN 521 using Ethernet and, therefore, use the same physical path(s) used to send bridged communication packets (e.g., uses the same physical network interface of physical computing resources 422 and 432). Other examples may use link layer protocols within Internet Protocol (IP) other than Ethernet. Establishing the BFD session in this manner does not require any IP addressing, as it is based in L2, and allows for loop detection in examples where loop detection is desired. In some cases, switches in L2 domain 511 may need to be configured to allow the packet traffic on the BFD session.

Once the BFD session has been established, method 600 provides transferring the MAC address of active bridge 501 to standby bridge 504 in one of the periodic BFD heartbeat messages (601). Preferably the MAC address is transferred as soon as possible, likely in the first BFD packet exchanged, so that synchronizing of information between active bridge 501 and standby bridge 504 can begin. Standby bridge 504 performs RARP, or another similar function, on the MAC address to determine an IP address on VLAN 521 with which standby bridge 504 and active bridge 501 can communicate.

While bridging communications, active bridge 501 learns the MAC addresses of endpoints on individual communication connections. Method 600 provides active bridge 501 transferring those learned MAC addresses to standby bridge 504 (603). For example, a communication connection between VM 413 and VM 411 may be bridged by active bridge 501. The respective MAC addresses for M 413 and VM 411 are noted by active bridge 501 and transferred to standby bridge 504 so that standby bridge 504 can continue to bridge those communications should active bridge 501 fail, as described in more detail below. The learned MAC addresses may be transferred within a table of learned MAC addresses or may be formatted in some other way. Each time a new connection is established through active bridge 501, active bridge 501 may transfer the MAC addresses for that connection to standby bridge 504. However, other schedules may be used, such as a periodic transfer of MAC addresses for connections created since the last update of learned MAC addresses was sent. It should be understood that active bridge 501 may further update standby bridge 504 when MAC addresses are no longer relevant (e.g., when the connection associated with those MAC addresses has been taken down).

Method 600 then provides activating standby bridge 504 upon standby bridge 504 not receiving any BFD heartbeat messages within the requisite period of time necessary to indicate that active bridge 501 is still active (604). In some examples, active bridge 501 may transfer multiple BFD heartbeat messages for a given period of time. Each of the multiple heartbeat messages corresponds to each respective physical path that may be traversed between active bridge 501 and standby bridge 504. Likewise, each path may correspond to a different BFD session established between active bridge 501 and standby bridge 504. In computing environment 400, only one physical path likely exists between active bridge 501 and standby bridge 504 (i.e., the path between host computing systems 421 and 431 through communications switch 441). However, in more complex computing environments many different paths may be available to traverse more complex physical networks. Should even one of the multiple paths remain available, then standby bridge 504 will receive at least one of the BFD heartbeat messages transferred from active bridge 501 and can conclude that active bridge 501 is still operational. However, should no BFD heartbeat messages be received, then standby bridge 504 can assume that active bridge 501 failed.

Figure 7:
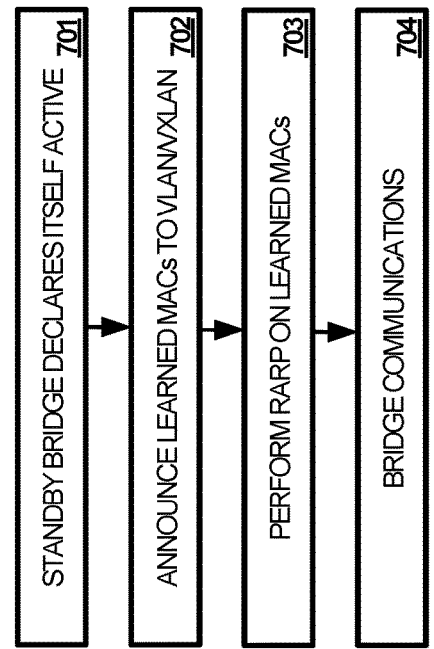
FIG. 7 illustrates another method of operating the other computing environment to provide high availability bridging between L2 networks.

FIG. 7 illustrates method 700 of operating computing environment 400 to provide high availability bridging between L2 networks. In particular, method 700 continues the example of method 600 by describing how standby bridge 504 becomes the active bridge with respect to step 604. Method 700 provides standby bridge 504 declaring itself to be the active bridge once no BFD message has been received in the requisite period of time (701). While now the active bridge, this example will still refer to standby bridge 504 for consistency.

After declaring itself active, standby bridge 504 must inform other elements that it is active so that communications can be routed through standby bridge 504 instead of continuing to attempt to route the communications through active bridge 501. To do so, method 700 provides standby bridge 504 announcing the learned MAC addresses, which were received from active bridge 501 when it was still active, to VLAN 521 and VXLAN 522 (702). Furthermore, as part of the announcing process, method 700 provides standby bridge 504 performing RARP, or a RARP-like process, on the learned MAC addresses to notify physical switches (e.g., switch 441) to direct traffic having the MAC addresses to standby bridge 504.

Now that VLAN 521 and VXLAN 522 are aware of standby bridge 504 being the active bridge and standby bridge 504 knows the IP addresses for the bridged communication endpoints, method 700 provides standby bridge 504 bridging communications between VLAN 521 and VXLAN 522 (704). Ideally, method 700 occurs very quickly to minimize the adverse effects on bridged communications caused by active bridge 501's failure. After completion of method 700, virtual bridge node 418 is hosting two active bridges with active bridge 503 and the now active standby bridge 504. Should active bridge 501 become operational again, standby bridge 504 may pass active bridging functions back to active bridge 501 to reduce the bridging load on virtual bridge node 418.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a high availability bridge cluster comprising a first network bridge node and a second network bridge node for high availability Layer 2 (L2) network bridging, wherein the first network bridge node includes a first active bridge and a first standby bridge and the second network bridge node includes a second active bridge and a second standby bridge, the method comprising:
   in the first active bridge, bridging first network communications between two or more L2 networks, wherein the second standby bridge acts as a failover bridge for the first active bridge;
   in the first active bridge, generating a failure detection message that incorporates a hardware address of the first network bridge node;
   transferring the failure detection message from the first network bridge node to the second network bridge node;
   in the second standby bridge, receiving the failure detection message and using the hardware address to synchronize bridging information between the first active bridge and the second standby bridge.

2. The method of claim 1, further comprising:
   in the second active bridge, bridging second network communications between the two or more L2 networks, wherein the first standby bridge acts as a failover bridge for the second active bridge;
   generating a second failure detection message that incorporates a second hardware address of the second network bridge node;
   transferring the second failure detection message from the second network bridge node to the first network bridge node;
   in the first standby bridge, receiving the second failure detection message and using the second hardware address to synchronize second bridging information between the second active bridge and the first standby bridge.

3. The method of claim 1, wherein using the hardware address to synchronize the bridging information comprises:
   identifying a first management plane network address for the first network bridge node associated with the hardware address;
   using the first management plane network address to provide the first network bridge node with a second management plane network address for the second network bridge node; and
   exchanging the bridging information between the first and second network bridge nodes using the first and second management plane network addresses.

4. The method of claim 1, wherein the bridging information includes hardware addresses of elements in the first network communications that are learned by the first active bridge while bridging the first network communications.

5. The method of claim 4, further comprising:
   upon activation of the second standby bridge, using the reverse address resolution protocol (RARP) with the hardware addresses to notify physical L2 network switches to direct the first network communications having the hardware addresses to the second standby bridge.

6. The method of claim 1, further comprising:
activating the second standby bridge upon not receiving at least one subsequent failure detection message from the first network bridge node.

7. The method of claim 1, wherein the failure detection message comprises one or more packets in a bidirectional forwarding detection (BFD) session between the first and second network bridge nodes.

8. The method of claim 7, wherein the BFD session operates over a link layer protocol within Internet Protocol (IP).

9. The method of claim 8, wherein the link layer protocol comprises Ethernet.

10. The method of claim 1, wherein the high availability bridge cluster is assigned a uniform unique identifier (UUID).

11. A system for implementing a high availability bridge cluster for high availability Layer 2 (L2) network bridging, the system comprising:
a first network bridge node including a first active bridge and a first standby bridge; and
a second network bridge node including a second active bridge and a second standby bridge;
wherein the first active bridge bridges first network communications between two or more L2 networks, wherein the second standby bridge acts as a failover bridge for the first active bridge, generates a failure detection message that incorporates a hardware address of the first network bridge node, and transfers the failure detection message from the first network bridge node to the second network bridge node;
wherein the second standby bridge receives the failure detection message and uses the hardware address to synchronize bridging information between the first active bridge and the second standby bridge.

12. The system of claim 11, wherein:
the second active bridge bridges second network communications between the two or more L2 networks, wherein the first standby bridge acts as a failover bridge for the second active bridge, generates a second failure detection message that incorporates a second hardware address of the second network bridge node, and transfers the second failure detection message from the second network bridge node to the first network bridge node;
the first standby bridge receives the second failure detection message and using the second hardware address to synchronize second bridging information between the second active bridge and the first standby bridge.

13. The system of claim 11, wherein to use the hardware address to synchronize the bridging information, the second standby bridge:
identifies a first management plane network address for the first network bridge node associated with the hardware address;
uses the first management plane network address to provide the first network bridge node with a second management plane network address for the second network bridge node; and
exchanges the bridging information between the first and second network bridge nodes using the first and second management plane network addresses.

14. The system of claim 11, wherein the bridging information includes hardware addresses of elements in the first network communications that are learned by the first active bridge while bridging the first network communications.

15. The system of claim 14, wherein the second standby bridge, upon activation, uses the reverse address resolution protocol (RARP) with the hardware addresses to notify physical L2 network switches to direct the first network communications having the hardware addresses to the second standby bridge.

16. The system of claim 11, wherein the second standby bridge activates upon not receiving at least one subsequent failure detection message from the first network bridge node.

17. The system of claim 11, wherein the failure detection message comprises one or more packets in a bidirectional forwarding detection (BFD) session between the first and second network bridge nodes.

18. The system of claim 17, wherein the BFD session operates over a link layer protocol within Internet Protocol (IP).

19. The system of claim 17, wherein the link layer protocol comprises Ethernet.

20. The system of claim 11, wherein a high availability bridge cluster is assigned a uniform unique identifier (UUID).

* * * * *